(12) United States Patent
Hirose

(10) Patent No.: US 8,009,366 B2
(45) Date of Patent: Aug. 30, 2011

(54) SUPER WIDE-ANGLE LENS

(75) Inventor: Masatoshi Hirose, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 43 days.

(21) Appl. No.: 12/515,493

(22) PCT Filed: Nov. 6, 2007

(86) PCT No.: PCT/JP2007/071539
§ 371 (c)(1),
(2), (4) Date: May 19, 2009

(87) PCT Pub. No.: WO2008/062661
PCT Pub. Date: May 29, 2008

(65) Prior Publication Data
US 2010/0060992 A1    Mar. 11, 2010

(30) Foreign Application Priority Data
Nov. 22, 2006   (JP) ................. 2006-315380

(51) Int. Cl.
*G02B 13/08*   (2006.01)
*G02B 13/18*   (2006.01)
(52) U.S. Cl. ............ 359/671; 359/715; 359/720
(58) Field of Classification Search ............ 359/668, 359/671, 708, 710, 713–715, 781, 720, 649–650, 359/669–670
See application file for complete search history.

(56) References Cited

U.S. PATENT DOCUMENTS

| | | | | |
|---|---|---|---|---|
| 3,658,410 | A | * | 4/1972 | Willey .................. 359/671 |
| 5,905,597 | A | * | 5/1999 | Mizouchi et al. ............ 359/671 |
| 7,280,289 | B2 | * | 10/2007 | Yamakawa .................... 359/715 |

FOREIGN PATENT DOCUMENTS

| | | |
|---|---|---|
| JP | 2002-244031 | 8/2002 |
| JP | 2003-307674 | 10/2003 |
| JP | 2005-227426 | 8/2005 |
| JP | 2006-11093 | 1/2006 |
| JP | 2006-011093 | 1/2006 |
| JP | 2006-259704 | 9/2006 |

* cited by examiner

*Primary Examiner* — Darryl J Collins
*Assistant Examiner* — Zachary Wilkes
(74) *Attorney, Agent, or Firm* — Cozen O'Connor

(57) ABSTRACT

A small-sized super wide-angle lens for a solid-state image sensor that is suitable for a digital input apparatus such as a monitoring camera and an onboard camera, which is excellent in terms of optical performance and is low in terms of cost. The super wide-angle lens includes, in order from an object side thereof: a first lens with a negative refractive power; a second lens with a negative refractive power; a third lens with a positive refractive power; and a fourth lens with a positive refractive power. The first lens is a meniscus lens including a convex surface facing the object side. Each of the second lens and the fourth lens includes at lest one rotational-asymmetric surface.

6 Claims, 6 Drawing Sheets

YZ SECTION

XZ SECTION

YZ SECTION

XZ SECTION

YZ SECTION

XZ SECTION

SUPER WIDE-ANGLE LENS

RELATED APPLICATIONS

This is a U.S. National Phase Application under 35 USC 371 of International Application PCT/JP2007/071539 filed on Nov. 6, 2007.

This application claims the priority of Japanese application no. 2006-315380 filed Nov. 22, 2006, the entire content of which is hereby incorporated by reference.

TECHNICAL FIELD

The present invention relates to a small-sized wide-angle lens system, and in particular, to a small-sized super wide-angle lens for solid-state image sensor that is suitable for a digital input apparatus (for example, a digital still camera and a digital video camera), especially employed for a monitoring camera and an onboard camera, and is excellent in terms of optical performance and is low in terms of cost.

BACKGROUND

There have been proposed many super wide-angle lenses for solid-state image sensors, to be used for a device such as a monitoring camera and an onboard camera.

In Patent Publications (see Patent Literatures 1 and 2), there are disclosed super wide-angle lenses in which an imaging area of about 150 degrees in terms of a total angle of view is secured.

Further, there is disclosed a super wide-angle lens in which an aspect ratio is changed by using a rotationally-asymmetric surface (see Patent Literature 3).

Patent Literature 1: Unexamined Japanese Patent Application Publication No. 2003-307674

Patent Literature 2: Unexamined Japanese Patent Application Publication No. 2005-227426

Patent Literature 3: Unexamined Japanese Patent Application Publication No. 2006-011093

SUMMARY

Technical Problem

In recent years, needs for photographing in wide angle have been diversified, in the optical systems to be used for on board and monitoring purposes. For example, the optical system of the onboard rearview camera is required to take an image in a super wide-angle of about 140° in terms of a total angle of view for the purpose of covering the dead angle of a driver, as far as the horizontal direction is concerned, while the optical system can be finely used when the total angle of view is about 90° which covers from the surface of land to the horizontal line, as far as the vertical direction is concerned.

Incidentally, the super wide-angle lens in Patent Literature 1 has a larger number of lenses as many as 5 and the super wide-angle lens in Patent Literature 2 has a four lenses, which do not consider to be used under environmental conditions in a variety of temperatures, as those for onboard cameras.

If an image pickup optical system that is rotationally symmetric around the optical axis is used for the needs typified by requirements for the onboard camera, the imaged area includes larger amount of unwanted area, especially along the vertical direction, which means the imaged area includes less necessary information.

In the super wide-angle lens in Patent Literature 3, the aspect ratio is changed by using a rotationally-asymmetric surface. However, a size of the super wide-angle lens becomes large because it is composed of six lenses.

The present invention has been achieved in view of the problems mentioned above, and its object is to provide a small-sized super wide-angle lens for a solid-state image sensor that is suitable for a digital input apparatus (for example, a digital still camera and a digital video camera) employed for a monitoring camera and an onboard camera, and is excellent in terms of optical performance, is low in terms of cost.

Solution to Problem

The above object is attained by the invention described below.

A zoom lens of the present invention comprises, in order from an object side thereof: a first lens with a negative refractive power that is a meniscus lens comprising a convex surface facing the object side; a second lens with a negative refractive power; a third lens with a positive refractive power; and a fourth lens with a positive refractive power. Each of the second lens and the fourth lens comprises at lest one rotationally-asymmetric surface.

Advantageous Effects of Invention

The super wide-angle lens of the invention is a four-lens constitution, and it has an excellent optical performance and a wide total angle of view as an image pickup lens system for a solid-state image sensor, and it can provide a wider angle only in the desired direction. Therefore, it can form necessary information on an image sensor without waste. Thus, a super wide-angle lens which is lower in cost and is more compact can be provided.

REFERENCE SIGNS LIST

Figure 1:
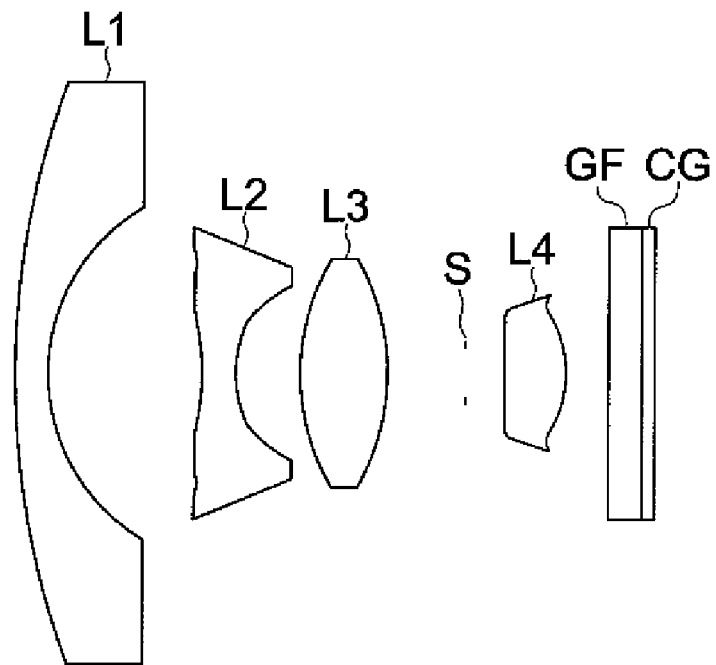
FIG. 1 is a lens-constitutional diagram of a wide-angle lens system of Example 1.
Figure 1:
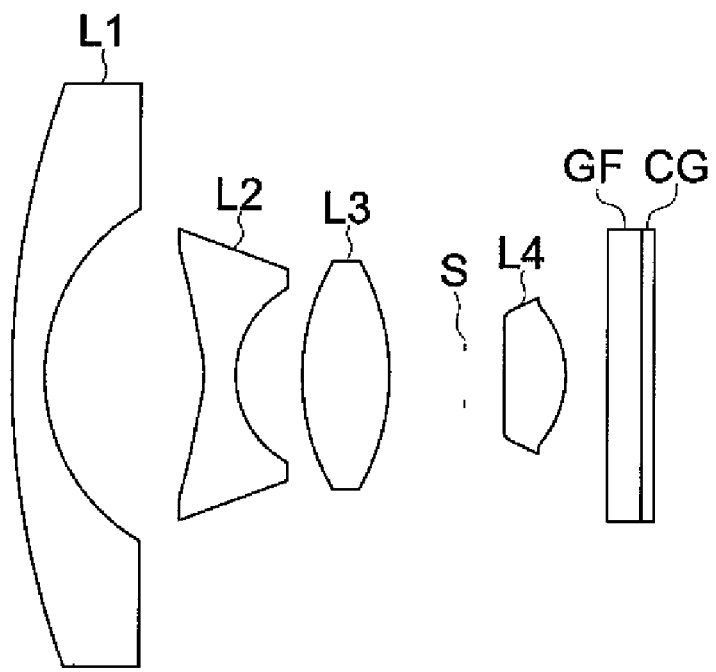

L1: First lens
L2: Second lens
L3: Third lens
L4: Fourth lens
S: Aperture stop
GF: Glass filter
CG: Cover glass

BEST MODE FOR CARRYING OUT THE INVENTION

Embodiments suitable for the invention will be explained as follows, referring to the drawings.

Incidentally, "power" mentioned in the present specification indicates a quantity defined by an inverse number of a focal length.

Further, a focal length of a rotationally-asymmetric surface is calculated based on the paraxial curvature of each section for an anamorphic surface, and is calculated by converting a secondary term into a local curvature for a free-form surface. A distortion value is a value compared with an ideal image height obtained from $Y'=f\cdot\tan\omega$ (where, Y' represents an image height, f represents a focal length of the total system and $\omega$ represents a half angle of view).

Further, in the invention, the following conditional expressions (1), (2) and (3) are calculated with considering that a longitudinal side extends in the direction of X axis. Alternatively, if the rotation of 90° in which the optical axis is employed as its rotation axis is considered, they are exactly equivalent to the occasion where the longitudinal side extends along Y axis. In this case, values in the aforesaid conditional expressions become inverse numbers.

Figure 4:
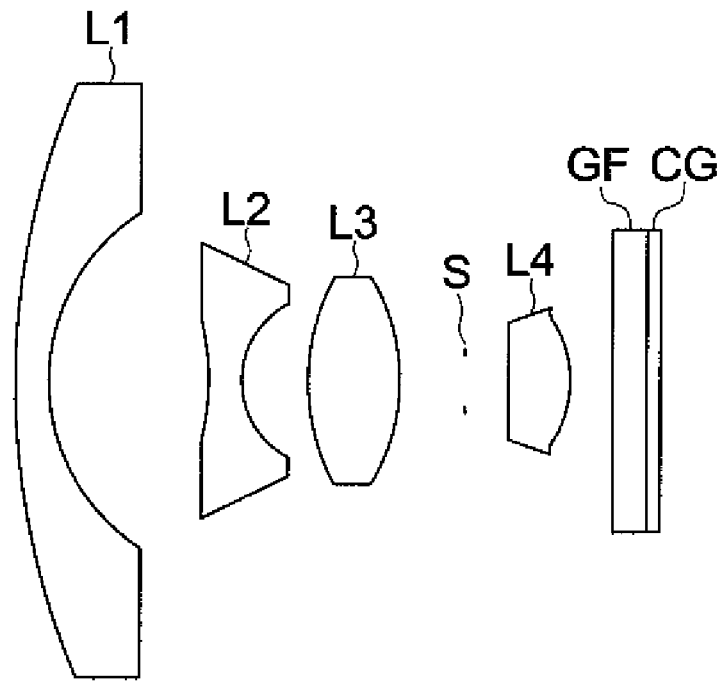
FIG. 4 is a lens-constitutional diagram of a wide-angle lens system of Example 2.
Figure 4:
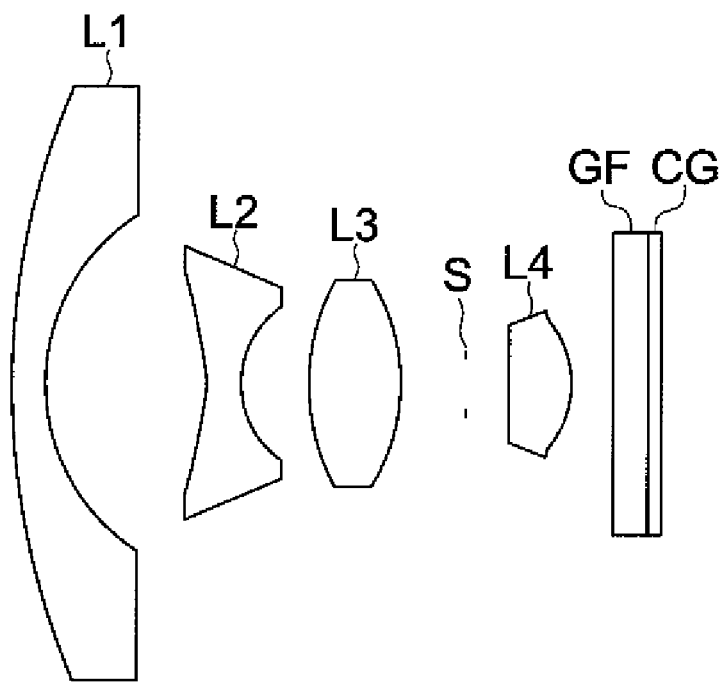
Figure 7:
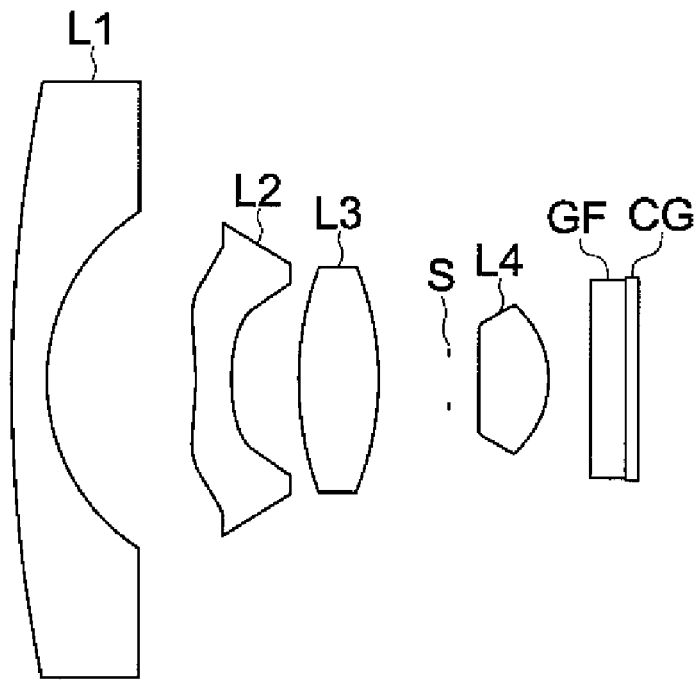
FIG. 7 is a lens-constitutional diagram of a wide-angle lens system of Example 3.
Figure 7:
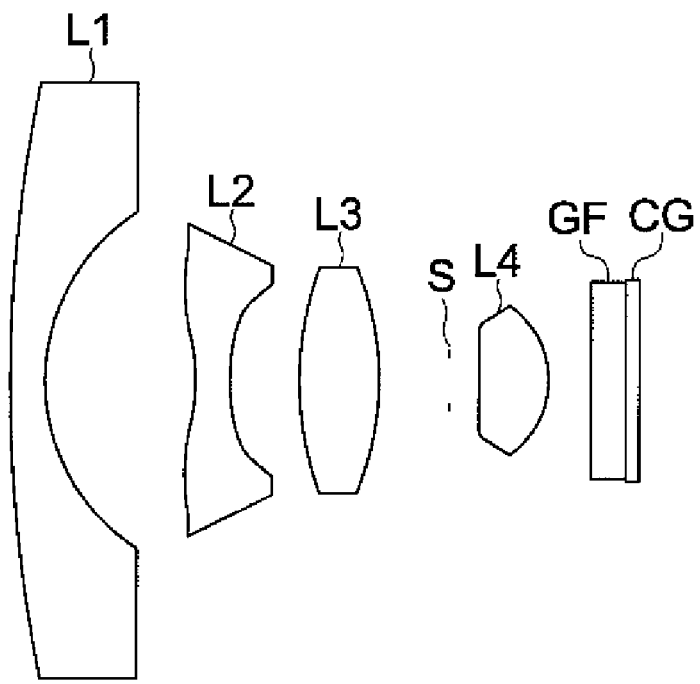

Each of FIGS. 1, 4 and 7 is a sectional view indicating a lens arrangement of a super wide-angle lens in Examples 1 to 3 relating to the invention.

The super wide-angle lens in each of Examples 1 to 3 is composed of first lens L1 having negative refractive power, second lens L2 having negative refractive power, third lens L3 having positive refractive power, aperture stop S, fourth lens L4 having positive refractive power, glass filter GF and of cover glass CG, in this order from the object side.

For more detail, the super wide-angle lens in each of Examples 1 to 3 is composed of first lens L1 which is a meniscus lens with negative refractive power and includes a convex surface facing the object side, second lens L2 which is a biconcave lens, third lens L3 with positive refractive power, fourth lens L4 with positive refractive power in which a stronger convex surface faces the image side and, glass filter GF and cover glass CG, in this order from the object side. Further, each of the first lens L1 and the third lens L3 is a glass lens whose both surfaces are spherical, and each of the second lens L2 and the fourth lens L4 is an aspheric plastic lens wherein at least one surface is an asymmetric surface.

By employing the aforesaid constitution, it is possible to correct distortion properly, while securing a wide angle of view.

Since each of the first lens L1 and the third lens L3 is composed of glass lenses, it is possible to control deterioration of performance with respect to environmental changes such as temperature changes.

Further, by constituting each of the first lens L1 and the third lens L3 with a glass spherical lens, it is possible to provide an optical system which is less expensive than the one composed of a glass aspheric lens. In addition, by arranging a plastic aspheric lens including at least one rotationally-symmetric surface, as the second lens L2, aspect ratios in the horizontal direction and the vertical direction can be changed. By arranging a plastic aspheric lens including at least one rotationally-asymmetry surface, as the fourth lens L4, it is possible to correct a difference of performances such as shift of focusing positions in the horizontal direction and the vertical direction which are caused on the second surface.

The rotationally-asymmetric surface is an anamorphic surface in a shape defined by the following expression employing a local Cartesian coordinate system (x, y, z) whose origin is on the top of the surface.

$$z=(CX\cdot x^2+CY\cdot y^2)/[1+\sqrt{1-(1+KX)\cdot CX^2\cdot x^2-(1+KY)\cdot CY^2\cdot y^2}]+AR\cdot[(1-AP)\cdot x^2+(1+AP)\cdot y^2]^2+BR\cdot[(1-BP)\cdot x^2+(1+BP)\cdot y^2]^3+CR\cdot[(1-CP)\cdot x^2+(1+CP)\cdot y^2]^4+DR\cdot[(1-DP)\cdot x^2+(1+DP)\cdot y^2]^5$$

In the expression, z represents a displacement amount along the z-axis at the position of coordinates (x, y) (measured from the top on the surface), each of CX and CY is a curvature (=1/curvature radius) at the top of the surface in the xz and yz sections, KX and KY are conic constants for xz and yz cross sections, AR, BR, CR, and DR are rotationally-symmetric coefficients of the 4th order, 6th order, 8th order, and 10th order deformed from the conic, and AP, BP, CP, and DP are rotationally-asymmetric coefficients of 4th order, 6th order, 8th order, and 10th order deformed from the conic. Further, as for an anamorphic aspheric surface, its almost equivalent surface-form can be represented by an expression of a free-form surface (XYP). In other words, even when a lens is designed by using an expression of a free-form surface, the expression turns out to be the same as the expression for the anamorphic surface by converting a certain constant of a free-form surface. Therefore, even if a lens surface is designed with the free-form surface, the lens is within a scope of the present invention, as far as neither the vertical direction nor the horizontal direction is symmetric.

The rotationally-asymmetric surface is a free-form surface in a shape defined by the following expression employing a local rectangular coordinate system (x, y, z) whose origin is on a top of the surface.

$$z=c\cdot h^2/[1+\sqrt{1-(1+K)\cdot c^2\cdot h^2}]+m\Sigma n\Sigma[C(m,n)\cdot x^m\cdot y^n]$$

In the expression, z is a displacement amount along the z-axis at the height h (measured from the top of the surface), h is a height in the direction perpendicular to z-axis ($h^2=x^2+y^2$), c is a curvature at the top of the surface (=1/radius of curvature), K is a conic constant and C(m, n) is free-form-surface coefficient (where m, n=0, 1, 2 . . . ).

Next, a conditional expression to be satisfied by a super wide-angle lens system in each embodiment will be explained. In the meantime, a super wide-angle lens system in each embodiment does not need to satisfy all of the following conditional expressions simultaneously, and can achieve corresponding functions and effects by satisfying each conditional expression individually. It is naturally desirable, from the viewpoint of optical performance, downsizing or assembling, that plural conditional expressions are satisfied.

$$0.5 \leq |f2x/f4x| < 2 \tag{1}$$

$$0.5 \leq |f2y/f4y| < 2 \tag{2}$$

In the expressions, f2x represents a paraxial focal length of the second lens in XZ section, f2y represents a paraxial focal length of the second lens in Yz section, f4x represents a paraxial focal length of the fourth lens in XZ section, and f4y represents a paraxial focal length of the fourth lens in YZ section.

Conditional expressions (1) and (2) are those for preventing performance from lowering due to temperature changes. When the conditional expressions (1) and (2) are not satisfied, a shift amount of an image forming position turns out to be great.

$$\omega X > 150 \quad (3)$$

In the expression, ωX represents the maximum of the total angle of view (deg) in the direction of a longitudinal side.

If the total angle of view is not higher than the conditional expression (3), a difference from the optical system which can be formed with a rotationally-symmetric optical system becomes smaller. Namely, by providing the optical system so as to satisfy the conditional expression (3), it is possible to secure an extremely wide angle of view only in a necessary direction, then, to prevent unnecessary photographic object in the unnecessary direction from entering into an image and to display information in the necessary direction to be large.

$$-0.6 < fx/f2x < -0.2 \quad (4)$$

$$-0.6 < fy/f2y < -0.2 \quad (5)$$

In the expressions, fx is a focal length of the total system in XZ section, fy is a focal length of the total system in YZ section, f2x is a focal length of the second lens in YZ section and f2y is a focal length of the second lens in YZ section.

Conditional expressions (4) and (5) indicate conditions for balancing mainly an exit pupil position and distortion with respect to the power of the second lens. When the values of the conditional expressions (4) and (5) are lower than the lower limits, deterioration of distortion becomes remarkable though the exit pupil position is given the benefits. Further, when the values of the conditional expressions exceed the upper limits, it causes disadvantageous for the exit pupil position, and a space of lens back cannot be secured.

$$vd3 < 50 \quad (6)$$

The conditional expression (6) indicates conditions to restrain magnification chromatic aberration, with respect to the Abbe number of the third lens.

If the value exceeds the conditional expression (6), performance deterioration on the periphery caused by magnification chromatic aberration becomes remarkable.

EXAMPLES

Concerning Examples relating to the invention, an example that is further specific will be explained as follows, referring to construction data and aberration diagrams.

Examples 1 to 3 shown below correspond to the aforesaid embodiments, respectively.

Further, it is assumed that the surface marked with an aspheric surface (ASP) is defined by the following expression that indicates a surface form of an aspheric surface.

$$z = C \cdot h^2 / \{1 + \sqrt{(1 - \epsilon \cdot C^2 \cdot H^2)}\} + \Sigma Ai \cdot Hi$$

In the expression, z represents an amount of displacement (measured from the top of the surface) in the optical axis direction at height h, h represents a height in the direction perpendicular to the optical axis, C represents a paraxial curvature, ε represents a quadratic-curved surface parameter, Ai represents $i^{th}$ order aspheric surface coefficient and Hi represents a sign indicating H to the $i^{th}$.

Incidentally, signs in the surface numbers are as follows.
AAS: Anamorphic aspheric surface
ASP: Aspheric surface
GF: Glass filter
CG: Cover glass Example 1

Optical parameters of Example 1 are shown below.
Focal length in XZ section: 1.374
Focal length in YZ section: 1.475
F No. in XZ section: 2.75
F No. in YZ section: 2.8
Lens data are shown in Table 1.

TABLE 1

| Surface No. | YZ paraxial curvature radius | XZ paraxial curvature radius | Space between surfaces | Refractive index | Dispersion |
|---|---|---|---|---|---|
| 1 | 20.243 | — | 0.800 | 1.77250 | 49.6 |
| 2 | 4.652 | — | 3.682 | | |
| 3 (AAS) | −3.570 | −3.508 | 0.800 | 1.53048 | 55.7 |
| 4 (AAS) | 4.458 | 3.799 | 1.553 | | |
| 5 | 5.547 | — | 2.090 | 1.83400 | 37.3 |
| 6 | −5.703 | — | 1.667 | | |
| 7 (Stop) | ∞ | — | 0.935 | | |
| 8 (ASP) | 16.410 | — | 1.473 | 1.53048 | 55.7 |
| 9 (AAS) | −2.421 | −2.263 | 1.000 | | |
| 10 (GF) | ∞ | — | 0.800 | 1.54600 | 66.0 |
| 11 (CG) | ∞ | — | 0.300 | 1.51680 | 64.2 |

Aspheric surface data are shown in Table 2. Meanwhile, it is assumed, hereafter (including lens data in Tables), that an exponent of 10 (for example, $2.5 \times 10^{-3}$) is expressed by E (for example, 2.5E-3).

TABLE 2

| Anamorphic aspheric surface data of $3^{rd}$ surface | | | | | | | |
|---|---|---|---|---|---|---|---|
| KX: | 0 | KY: | 0 | | | | |
| AR: | 3.2854E−02 | BR: | −3.3358E−03 | CR: | 2.0606E−04 | DR: | −4.5073E−06 |
| AP: | 1.2341E−01 | BP: | 1.2140E−01 | CP: | 1.2186E−01 | DP: | 1.8398E−01 |
| Anamorphic aspheric surface data of $4^{th}$ surface | | | | | | | |
| KX: | 0 | KY: | 0 | | | | |
| AR: | 3.1317E−02 | BR: | 9.6216E−03 | CR: | −2.7753E−03 | DR: | 1.6634E−04 |
| AP: | 1.8262E−01 | BP: | −4.2823E−02 | CP: | −2.2960E−02 | DP: | −5.5396E−02 |
| Aspheric surface data of $8^{th}$ surface | | | | | | | |
| K: | 0 | | | | | | |
| A: | −5.3297E−02 | B: | 5.2083E−02 | CR: | −2.6928E−02 | DR: | 5.9708E−03 |
| Anamorphic aspheric surface data of $9^{th}$ surface | | | | | | | |
| KX: | 0 | KY: | 0 | | | | |
| AR: | −7.4771E−09 | BR: | −8.4325E−04 | CR: | 3.1644E−03 | DR: | −5.9492E−14 |
| AP: | 5.5140E+02 | BP: | 3.1465E−01 | CP: | 7.9163E−02 | DP: | 6.3035E+01 |

Table 3 shows coordinates (x, y) of positions at evaluation image points F1-F9.

TABLE 3

| | (x, y) | | (x, y) | | (x, y) |
|---|---|---|---|---|---|
| F1 | 0.000, 0.000 | F2 | 0.000, 0.700 | F3 | 0.000, 1.346 |
| F4 | 0.900, 0.000 | F5 | 0.900, 0.700 | F6 | 0.900, 1.346 |
| F7 | 1.791, 0.000 | F8 | 1.791, 0.700 | F9 | 1.791, 1.346 |

Figure 2:
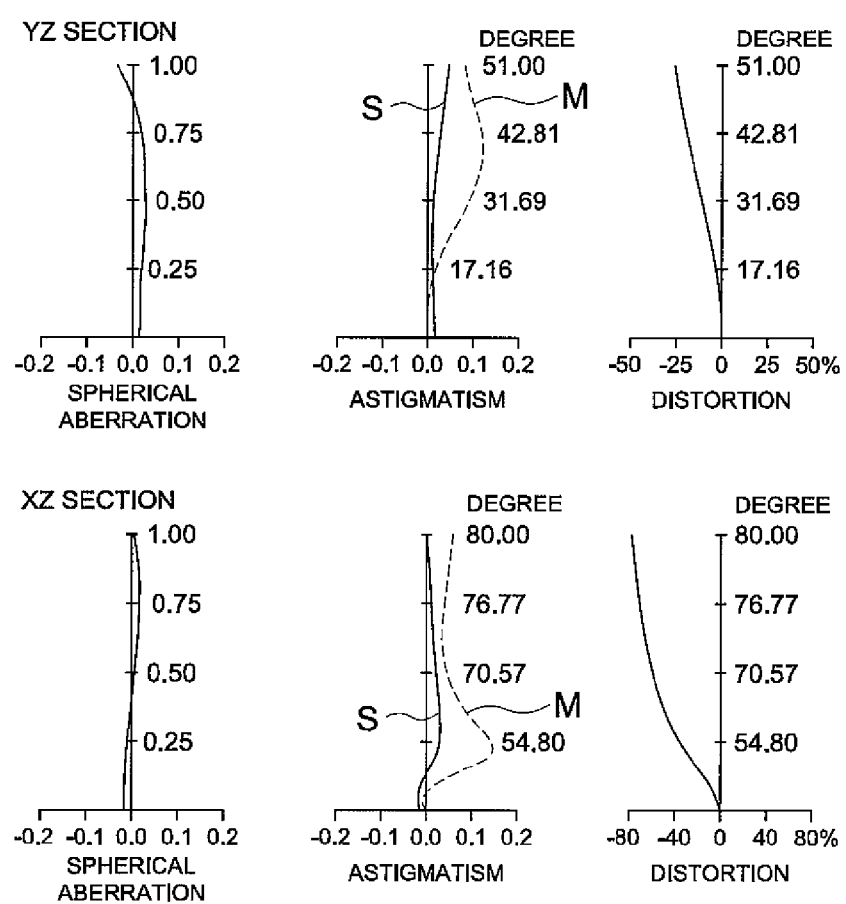
FIG. 2 shows aberration diagrams taken in YZ section and XZ section for a wide-angle lens system of Example 1.
Figure 3:
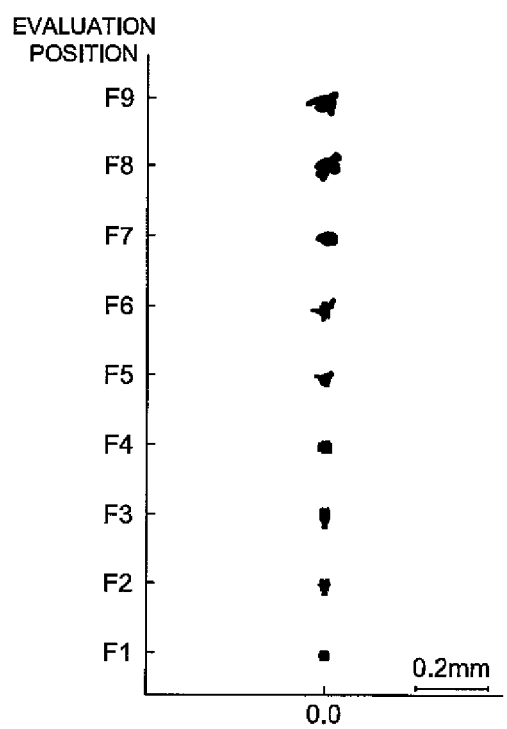
FIG. 3 shows a spot diagram of Example 1.

Further, FIG. 1 shows a lens constructive diagram, FIG. 2 shows aberration diagrams in YZ section and XZ section and FIG. 3 shows a spot diagram.

Example 2

Optical parameters of Example 2 are shown below.
Focal length in XZ section: 1.382
Focal length in YZ section: 1.483
F No. in XZ section: 2.73
F No. in YZ section: 2.8
Lens data are shown in Table 4.

TABLE 4

| Surface No. | YZ paraxial curvature radius | XZ paraxial curvature radius | Space between surfaces | Refractive index | Dispersion |
|---|---|---|---|---|---|
| 1 | 17.576 | — | 0.800 | 1.77250 | 49.6 |
| 2 | 4.666 | — | 3.698 | | |
| 3 (AAS) | −3.770 | −3.446 | 0.800 | 1.53048 | 55.7 |
| 4 (AAS) | 3.882 | 3.579 | 1.553 | | |
| 5 | 5.382 | — | 2.105 | 1.77250 | 49.6 |
| 6 | −4.824 | — | 1.556 | | |
| 7 (Stop) | ∞ | — | 0.982 | | |
| 8 (ASP) | 19.588 | — | 1.449 | 1.53048 | 55.7 |
| 9 (AAS) | −2.438 | −2.291 | 1.000 | | |
| 10 (GF) | ∞ | — | 0.800 | 1.54600 | 66.0 |
| 11 (CG) | ∞ | — | 0.300 | 1.51680 | 64.2 |

Aspheric surface data are shown in Table 5.

Table 6 shows positions (x, y) of evaluation image points F1 to F9.

TABLE 6

| | (x, y) | | (x, y) | | (x, y) |
|---|---|---|---|---|---|
| F1 | 0.000, 0.000 | F2 | 0.000, 0.700 | F3 | 0.000, 1.346 |
| F4 | 0.900, 0.000 | F5 | 0.900, 0.700 | F6 | 0.900, 1.346 |
| F7 | 1.791, 0.000 | F8 | 1.791, 0.700 | F9 | 1.791, 1.346 |

Figure 5:
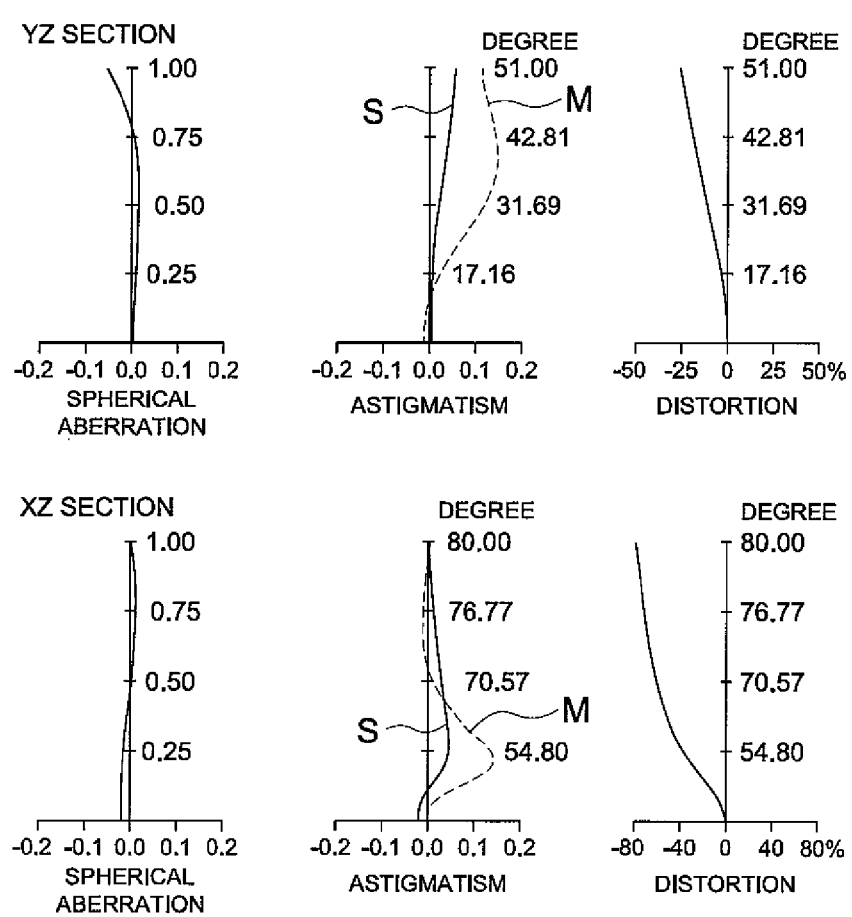
FIG. 5 shows aberration diagrams taken in YZ section and XZ section for a wide-angle lens system of Example 2.
Figure 6:
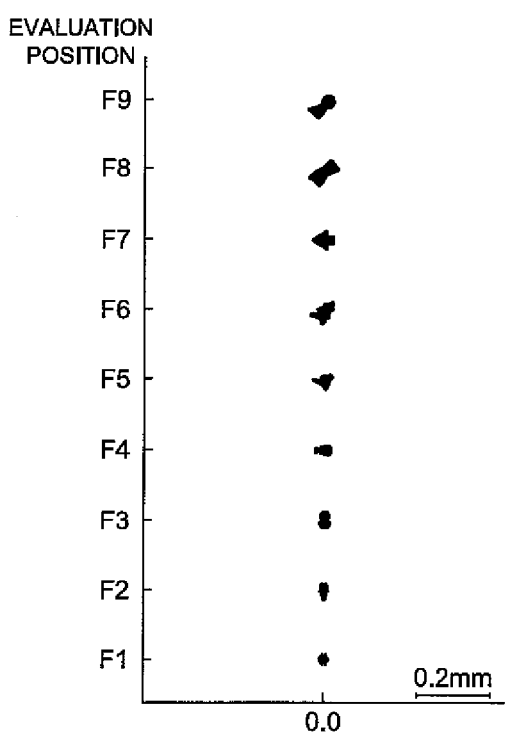
FIG. 6 shows a spot diagram of Example 2.

Further, FIG. 4 shows a structural diagram of a lens, FIG. 5 shows aberration diagrams in YZ section and XZ section and FIG. 6 shows a spot diagram.

Example 3

Optical values of Example 3 are shown below.
Focal length in XZ section: 1,360
Focal length in YZ section: 1.402
F No. in XZ section: 2.75
F No. in YZ section: 2.8
Lens data are shown in Table 7.

TABLE 7

| Surface No | YZ paraxial radius of curvature | XZ paraxial radius of curvature | Space between surfaces | Refractive index | Dispersion |
|---|---|---|---|---|---|
| 1 | 35.019 | — | 0.800 | 1.77250 | 49.6 |
| 2 | 4.628 | — | 3.410 | | |
| 3 (AAS) | −3.857 | −3.867 | 0.800 | 1.53048 | 55.7 |
| 4 (AAS) | 16.570 | 12.014 | 1.567 | | |
| 5 | 7.412 | — | 1.820 | 1.84666 | 23.7 |
| 6 | −7.023 | — | 1.627 | | |
| 7 (Stop) | ∞ | — | 0.707 | | |
| 8 (ASP) | −19.585 | — | 1.586 | 1.53048 | 55.7 |
| 9 (AAS) | −1.945 | −1.913 | 1.000 | | |
| 10 (GF) | ∞ | — | 0.800 | 1.54600 | 66.0 |
| 11 (CG) | ∞ | — | 0.300 | 1.51680 | 64.2 |

TABLE 5

| Anamorphic aspheric surface data on $3^{rd}$ surface | | | | | | | |
|---|---|---|---|---|---|---|---|
| KX: | 0 | KY: | 0 | | | | |
| AR: | 3.2569E−02 | BR: | −3.3842E−03 | CR: | 2.0294E−04 | DR: | −4.2223E−06 |
| AP: | 1.1748E−01 | BP: | 1.2347E−01 | CP: | 1.1022E−01 | DP: | 1.5047E−01 |
| Anamorphic aspheric surface data on $4^{th}$ surface | | | | | | | |
| KX: | 0 | KY: | 0 | | | | |
| AR: | 3.5689E−02 | BR: | 1.0104E−02 | CR: | −2.7728E−03 | DR: | 1.3645E−04 |
| AP: | 1.7562E−01 | BP: | −3.6903E−02 | CP: | −4.0283E−03 | DP: | −3.4404E−02 |
| Aspheric surface data on $8^{th}$ surface | | | | | | | |
| K: | 0 | | | | | | |
| A: | −5.3288E−02 | B: | 5.4145E−02 | CR: | −2.7728E−02 | DR: | 6.5536E−03 |
| Anamorphic aspheric surface data on $9^{th}$ surface | | | | | | | |
| KX: | 0 | KY: | 0 | | | | |
| AR: | −8.9790E−09 | BR: | −1.2849E−06 | CR: | 3.0508E−03 | DR: | −4.3159E−14 |
| AP: | 5.5471E+02 | BP: | 4.9267E+00 | CP: | 4.4586E−02 | DP: | 6.8160E+01 |

Aspheric surface data is shown in Table 8.

TABLE 8

Anamorphic aspheric surface data on $3^{rd}$ surface

| | | | | | | | |
|---|---|---|---|---|---|---|---|
| KX: | 0 | KY: | 0 | | | | |
| AR: | 3.8757E−02 | BR: | −3.1585E−03 | CR: | 1.4996E−04 | DR: | −2.9934E−06 |
| AP: | 1.3668E−01 | BP: | 8.5729E−02 | CP: | 5.9388E−02 | DP: | 1.3199E−01 |

Anamorphic aspheric surface data on $4^{th}$ surface

| | | | | | | | |
|---|---|---|---|---|---|---|---|
| KX: | 0 | KY: | 0 | | | | |
| AR: | 3.5418E−02 | BR: | 8.2886E−03 | CR: | −1.9399E−03 | DR: | 9.0172E−05 |
| AP: | 1.5703E−01 | BP: | 1.3221E−01 | CP: | 9.7593E−02 | DP: | 1.2046E−02 |

Aspheric surface data on $8^{th}$ surface

| | | | | | | | |
|---|---|---|---|---|---|---|---|
| K: | 0 | | | | | | |
| A: | −9.3867E−02 | B: | 1.3502E−01 | CR: | −1.2144E−01 | DR: | 4.3171E−02 |

Anamorphic aspheric surface data on $9^{th}$ surface

| | | | | | | | |
|---|---|---|---|---|---|---|---|
| KX: | 0 | KY: | 0 | | | | |
| AR: | −1.3499E−08 | BR: | 1.2350E−06 | CR: | 3.2886E−03 | DR: | −9.6787E−09 |
| AP: | 3.0818E+02 | BP: | 1.1274E+01 | CP: | 4.5406E−02 | DP: | 7.6804E−00 |

Table 9 shows positions (x, y) of evaluation image points F1 to F9.

TABLE 9

| | (x, y) | | (x, y) | | (x, y) |
|---|---|---|---|---|---|
| F1 | 0.000, 0.000 | F2 | 0.000, 0.700 | F3 | 0.000, 1.346 |
| F4 | 0.900, 0.000 | F5 | 0.900, 0.700 | F6 | 0.900, 1.346 |
| F7 | 1.791, 0.000 | F8 | 1.791, 0.700 | F9 | 1.791, 1.346 |

Figure 8:
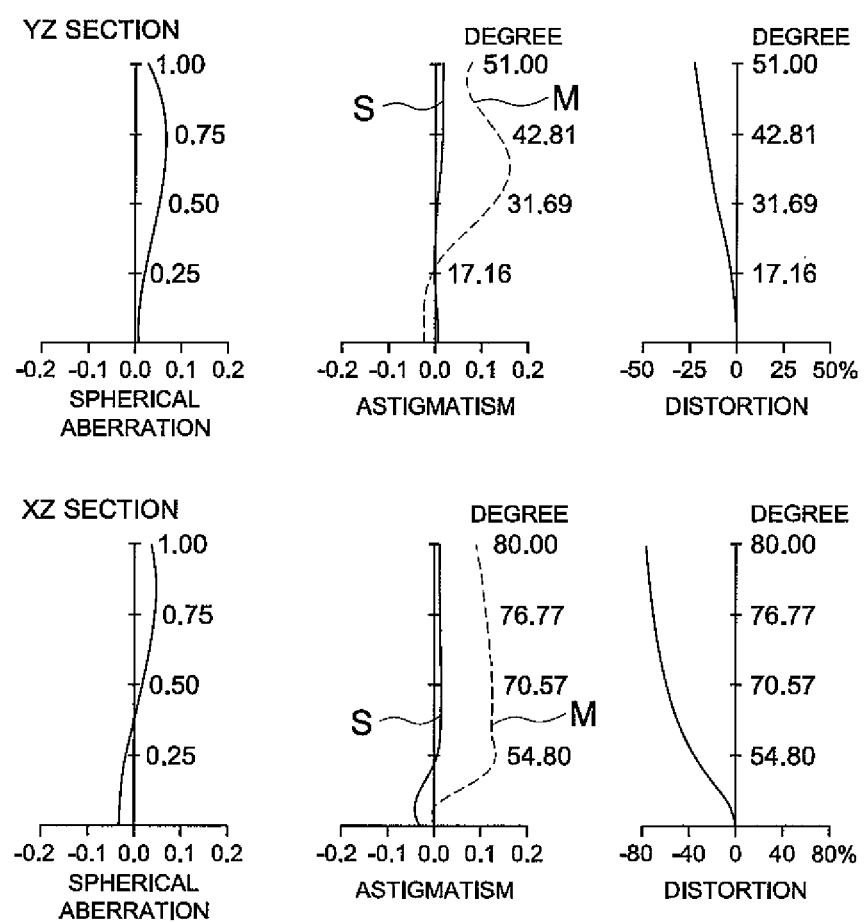
FIG. 8 shows aberration diagrams taken in YZ section and XZ section for a wide-angle lens system of Example 3.
Figure 9:
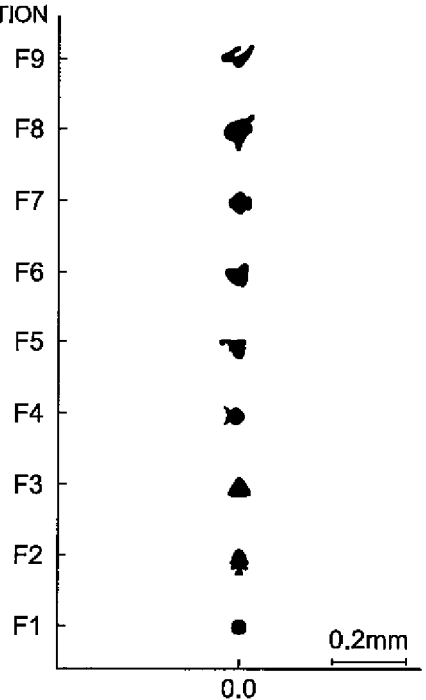
FIG. 9 shows a spot diagram of Example 3.

Further, FIG. 7 shows a structural diagram of a lens, FIG. 8 shows aberration diagrams in YZ section and XZ section and FIG. 9 shows a spot diagram.

Furthermore, Table 10 shows values corresponding to parameters prescribed by conditional expressions (1) to (6) of respective numerical Examples.

TABLE 10

| | Conditional expression range | | | | | |
|---|---|---|---|---|---|---|
| | (1) | (2) | (3) | (4) | (5) | (6) |
| Example 1 | 0.50 | 0.80 | 160° | −0.414 | −0.434 | 37.3 |
| Example 2 | 0.51 | 0.83 | 160° | −0.492 | −0.426 | 49.6 |
| Example 3 | 1.61 | 1.70 | 160° | −0.251 | −0.241 | 23.7 |

Meanwhile, in each of FIGS. 2, 5 and 8, a vertical axis in each of an astigmatism diagram and a distortion diagram indicates the maximum of the angle of view of each of XZ section and YZ section.

The invention claimed is:

1. A super wide-angle lens comprising, in order from an object side thereof:
  a first lens with a negative refractive power, being a meniscus lens comprising a convex surface facing the object side;
  a second lens with a negative refractive power;
  a third lens with a positive refractive power; and
  a fourth lens with a positive refractive power,
  wherein each of the second lens and the fourth lens comprises at least one rotationally-asymmetric surface,
  wherein the at least one rotationally-asymmetric surface of the second lens changes an aspect ratio in a horizontal direction and a vertical direction,
  wherein the at least one rotationally-asymmetric surface of the fourth lens corrects a difference between shifts of focusing positions in the horizontal direction and the vertical direction which are caused on the at least one rotationally-asymmetric surface of the second lens, and
  wherein the super wide-angle lens satisfies the following expressions:

$$0.5 \leq |f2x/f4x| \leq 2,$$

$$0.5 \leq |f2y/f4y| \leq 2$$

where f2x is a paraxial focal length of the second lens in a XZ section,
f2y is a paraxial focal length of the second lens in a YZ section,
f4x is a paraxial focal length of the fourth lens in the XZ section, and
f4y is a paraxial focal length of the fourth lens in the YZ section.

2. The super wide-angle lens of claim 1,
wherein the rotationally-asymmetric surface is an anamorphic surface in a shape defined by the following expression with a local Cartesian coordinate system (x, y, z) whose origin is on a top of the rotationally-asymmetric surface:

$$z=(CX\cdot x^2+CY\cdot y^2)/[1+\sqrt{\{1-(1+KX)\cdot CX^2\cdot x^2-(1+KY)\cdot CY^2\cdot y^2\}}]+AR\cdot[(1-AP)\cdot x^2+(1+AP)\cdot y^2]^2+BR\cdot[(1-BP)\cdot x^2+(1+BP)\cdot y^2]^3+CR\cdot[(1-CP)\cdot x^2+(1+CP)\cdot y^2]^4+DR\cdot[(1-DP)\cdot x^2+(1+DP)\cdot y^2]^5,$$

where z is a displacement amount along a z-axis at a position of coordinates (x, y), the displacement amount being measured from the top of the rotationally-asymmetric surface,
each of CX and CY is a curvature at the top surface in a xz section and a yz section (=1/curvature radius),
KX and KY are conic constants for the xz section and the yz section, respectively,
AR, BR, CR, and DR are rotationally symmetric coefficients of the 4th order, 6th order, 8th order, and 10th order deformations from a conic, respectively and
AP, BP, CP, and DP are rotationally-asymmetric coefficients of 4th order, 6th order, 8th order, and 10th order deformations from a conic, respectively.

3. The super wide-angle lens of claim 1,
wherein the rotationally-asymmetric surface is a free-form surface in a shape defined by the following expression with a local Cartesian coordinate system (x, y, z) whose origin is on a top of the rotationally-asymmetric surface:

$$z = c \cdot h^2 / [1 + \sqrt{\{1-(1+K) \cdot c^2 \cdot h^2\}}] + m\Sigma n\Sigma [C(m,n) \cdot x^m \cdot y^n],$$

where z is a displacement amount along a z-axis at a height h, the displacement amount being measured from a top of the surface, h is a height in a direction perpendicular to the z-axis where $h^2 = x^2 + y^2$, c is a curvature at the top of the surface, represented by 1/curvature radius, K is a conic constant, and C(m, n) is a free-form-surface coefficient where m, n=0, 1, 2 . . . .

4. The super wide-angle lens of claim 1,
wherein the super wide-angle lens satisfies the following expression:

νd3<50, where νd3 is an Abbe number of the third lens.

5. The super wide-angle lens of claim 1,
wherein the super wide-angle lens satisfies the following expression:

ωX>150 deg, where ωX is a maximum of a total angle of view in a longitudinal direction.

6. The super wide-angle lens of claim 1, further comprising:

an aperture stop arranged between the third lens and the fourth lens.

\* \* \* \* \*